No. 713,326. Patented Nov. 11, 1902.
E. W. MIX.
MAINTAINING SYNCHRONOUS ROTATION OF DYNAMO ELECTRIC MACHINES.
(Application filed Oct. 25, 1899.)
(No Model.)
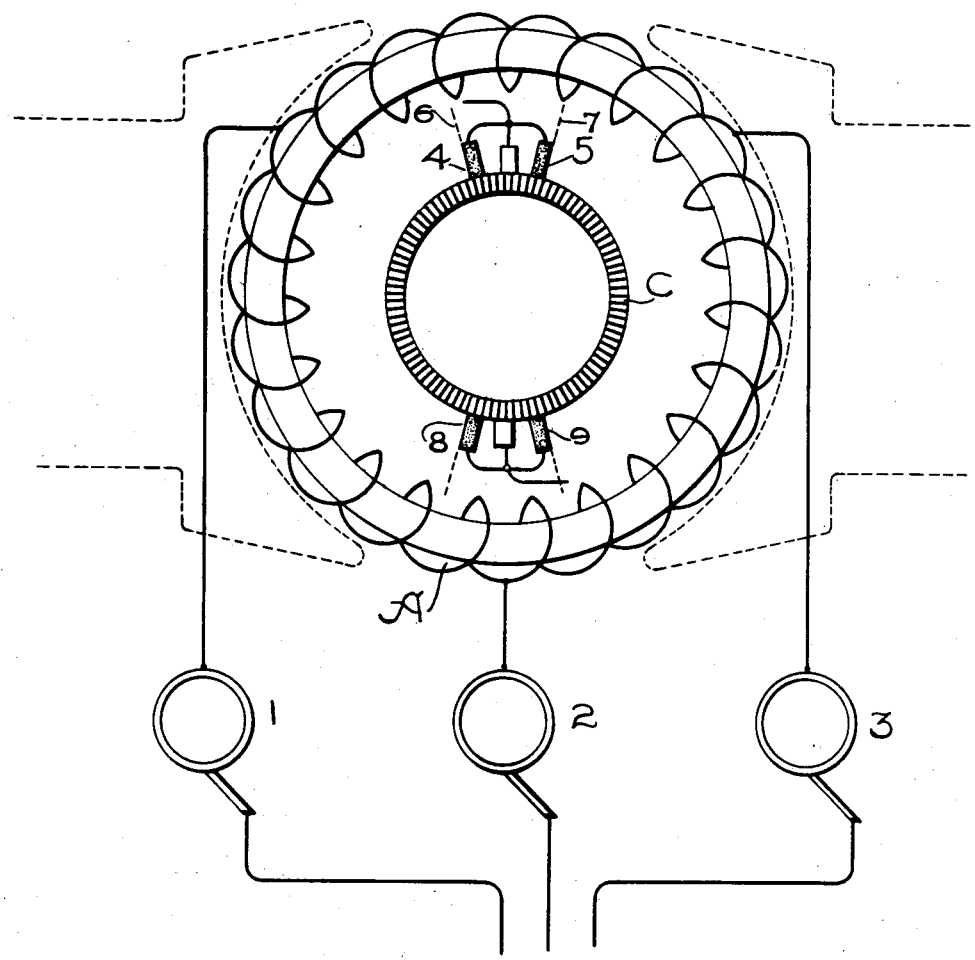
Witnesses.
Edward Williams, Jr.
Benjamin B. Hill
Inventor:
Edgar W. Mix,
by Albert G. Davis
Atty.

UNITED STATES PATENT OFFICE.

EDGAR W. MIX, OF PARIS, FRANCE, ASSIGNOR TO GENERAL ELECTRIC COMPANY, A CORPORATION OF NEW YORK.

MAINTAINING SYNCHRONOUS ROTATION OF DYNAMO-ELECTRIC MACHINES

SPECIFICATION forming part of Letters Patent No. 713,326, dated November 11, 1902.

Application filed October 25, 1899. Serial No. 734,997. (No model.)

*To all whom it may concern:*

Be it known that I, EDGAR W. MIX, a citizen of the United States, residing at Paris, France, have invented certain new and useful Improvements in Maintaining Synchronous Rotation of Dynamo-Electric Machines, (Case No. 1,073,) of which the following is a specification.

The present invention relates to a certain means for checking variations in speed of alternating-current dynamo-electric machines known in the art as "hunting," and is useful in some particular cases—as, for instance, where the hunting is caused by repeated and excessive variations of load. Its general nature and mode of application will be more clearly understood by reference to the following description, taken in connection with the accompanying drawing, while its scope will be pointed out in the appended claims.

In order to describe my invention, I have in the drawing chosen to represent its application to a rotary converter. For the sake of simplicity the converter is shown as having two poles; but it will readily be understood that the number of poles is unimportant so far as my invention is concerned. The armature-winding A is shown as tapped at three points and supplied with three-phase current through collector-rings 1 2 3. The commutator of the converter is shown at C, its connections with the armature-winding having been omitted in order to avoid useless complication of the drawing; but it is to be understood that any usual or suitable connections may be employed.

Instead of providing commutator-brushes and arranging them on the commutator in the usual manner, so as to extend over a number of segments just sufficient to secure sparkless commutation, I, on the contrary, cause the brushes to be staggered, or, in other words, arranged with one or more brushes in advance of the neutral line and others behind the neutral line, the brushes being electrically connected together by circuits of high conductivity, thereby producing local short circuits in the armature, represented by those armature-conductors connected to those commutator-segments within the extreme limits of that portion of the commutator which is spanned by the brushes. In the drawing two angularly-displaced brushes 4 5 are shown as bearing on the commutator and electrically connected to each other, thus acting to short-circuit a portion of the armature-winding—such, for example, as that comprised between the dotted lines 6 7. The brushes 4 and 5 are preferably of carbon in order to secure a minimum amount of sparking. For the purpose of more readily commutating and conducting the direct current away from the armature I may provide additional brushes of higher conducting material located between the carbon brushes 4 5 and electrically connected to them, as shown. A similar set of brushes 8 9 bear upon the opposite side of the commutator.

The mode of operation of my invention will be more clearly understood by first briefly describing phenomena with which it deals. In the normal operation of the converter, when the same is operating at unit-power factor, the armature reaction of the alternating current exactly balances that of the direct current, except for a small difference represented by the losses in the machine. In this condition the polar line due to the alternating-current reaction coincides with that due to the direct-current reaction, the direction of the latter being represented by the position of the commutator-brushes, which corresponds to a position midway between the field-poles. If for some reason—as, for instance, a change in load—the converter-armature is displaced from the neutral position corresponding to that of uniform rotation, it immediately tends to return to that position. Instead, however, of stopping when that position is reached it moves past the same, thereby encountering an opposing force tending to throw it back. In this manner the converter-armature may oscillate back and forth about a neutral position. By staggering the brushes on the commutator in the manner above described a local short circuit in the armature is produced. The induced currents set up in this local short circuit in the armature act to oppose the causes which produce them, and thus act to prevent variations in speed of the machine.

I have illustrated my invention as applied to a rotary converter, since the same is more often of use in connection with this type of machine, which seems to be particularly subject to the variations in speed known as "hunting;" but it is to be understood that my invention is not limited to use in this relation, but may find many other applications—as, for example, to synchronous motors, to alternating-current generators in parallel, or the like. In order to apply my invention to the machines last mentioned, it will readily be understood that suitable commutators are to be supplied, the same to be connected either with the main armature-winding of the machine or to an auxiliary winding, as may be desired. The constructions are so obvious that little advantage would be gained by further illustration in the drawing.

It will furthermore be understood that any suitable means may be employed for obtaining the local short-circuits of the armature conductors. Thus instead of staggered brushes the same function may be performed by single brushes of abnormal width.

What I claim as new, and desire to secure by Letters Patent of the United States, is—

1. The method of checking variations in speed of alternating-current dynamo-electric machines which consists in maintaining a local induced circuit in conductors on the armature of said machine.

2. The method of preventing the hunting of alternating-current dynamo-electric machines which consists in opposing the tendency to hunt by currents set up in conductors on the armature.

In witness whereof I have hereunto set my hand this 11th day of October, 1899.

EDGAR W. MIX. [L. S.]

Witnesses:
J. ALLISON BOWEN,
GEO. E. LIGHT.